United States Patent
Shen et al.

(10) Patent No.: US 12,251,661 B1
(45) Date of Patent: Mar. 18, 2025

(54) WASTE GAS PURIFICATION APPARATUS AND RESIDUAL HEAT UTILIZATION AND CONTROL DEVICE FOR INTELLIGENT PRINTING AND DYEING WASTE GAS

(71) Applicant: SUZHOU JINGTIAN AIREN ENVIRONMENTAL TECHNOLOGY CO. LTD., Suzhou (CN)

(72) Inventors: Zhongzeng Shen, Suzhou (CN); Liping Yu, Suzhou (CN); Feng Wu, Suzhou (CN); Yanlie Guo, Suzhou (CN); Zumin Li, Suzhou (CN); Min Wang, Suzhou (CN)

(73) Assignee: SUZHOU JINGTIAN AIREN ENVIRONMENTAL TECHNOLOGY CO. LTD., Suzhou (CN)

(*) Notice: Subject to any disclaimer, the term of this patent is extended or adjusted under 35 U.S.C. 154(b) by 0 days.

(21) Appl. No.: 18/641,875

(22) Filed: Apr. 22, 2024

Related U.S. Application Data (63) Continuation of application No. PCT/CN2023/140279, filed on Dec. 20, 2023.

(30) Foreign Application Priority Data

Sep. 18, 2023 (CN) .......................... 202311200643.6

(51) Int. Cl.
*B01D 53/78* (2006.01)
(52) U.S. Cl.
CPC ........ *B01D 53/78* (2013.01); *B01D 2252/103* (2013.01); *B01D 2257/70* (2013.01);
(Continued)

(58) Field of Classification Search
CPC ............. B01D 53/78; B01D 2252/103; B01D 2257/70; B01D 2258/0258;
(Continued)

(56) References Cited

FOREIGN PATENT DOCUMENTS

| CN | 203017966 U | 6/2013 |
|---|---|---|
| CN | 104998506 A | 10/2015 |

(Continued)

*Primary Examiner* — Christopher P Jones
*Assistant Examiner* — Phillip Y Shao
(74) *Attorney, Agent, or Firm* — SZDC Law PC

(57) ABSTRACT

The invention provides a waste gas purification apparatus and residual heat utilization and control device for intelligent printing and dyeing waste gas. The apparatus includes: a circulating water storage tank; a liquid circulation tank; a water filtration system, connected to the storage tank; a bubble generation device, connected to the storage tank; and an organic waste gas removal device. An upper end of the waste gas removal device is connected to the bubble generation device and the liquid circulation tank, and a lower end is connected to the liquid circulation tank. The utilization and control device includes a residual heat cascade utilization unit, a spraying unit, a composite pulse static absorption column unit, a twin-stage high-temperature water white smoke elimination unit, and an air discharge unit sequentially disposed in a waste gas flow direction, and includes an oil-water separation box, a sodium chloride electrolysis device, and the purification apparatus.

12 Claims, 5 Drawing Sheets

(52) U.S. Cl.
CPC ............... *B01D 2258/0258* (2013.01); *B01D 2259/124* (2013.01); *B01D 2259/655* (2013.01)

(58) Field of Classification Search
CPC ........ B01D 2259/124; B01D 2259/655; B01D 2259/4547
See application file for complete search history.

(56) References Cited

FOREIGN PATENT DOCUMENTS

| | | | |
|---|---|---|---|
| CN | 206276194 U | 6/2017 | |
| CN | 109225633 A | 1/2019 | |
| CN | 210496913 U | 5/2020 | |
| CN | 116943414 A | 10/2023 | |
| JP | 2010000453 A | 1/2010 | |

WASTE GAS PURIFICATION APPARATUS AND RESIDUAL HEAT UTILIZATION AND CONTROL DEVICE FOR INTELLIGENT PRINTING AND DYEING WASTE GAS

This application is the National Stage Application of PCT/CN2023/140279, filed on Dec. 20, 2023, which claims priority to Chinese Patent Application No. 202311200643.6, filed on Sep. 18, 2023, which is incorporated by reference for all purposes as if fully set forth herein.

FIELD OF THE INVENTION

The present invention relates to the field of printing and dyeing waste gas control technologies, and in particular, to a waste gas purification apparatus and a residual heat utilization and control device for intelligent printing and dyeing waste gas.

DESCRIPTION OF THE RELATED ART

A high-temperature condition is required in a production process in the textile printing and dyeing industry. For example, a setting and drying temperature ranges from 210° C. to 230° C. In this case, a waste gas generated in the production process also has a high temperature and a high oil content of approximately 400 $mg/m^3$ to 600 $mg/m^3$. In addition, such a high-temperature waste gas further contains a lot of fluff, impurities, and adhesives, and has heavy odors and smells. Therefore, in the textile printing and dyeing industry, high-temperature waste gas control is difficult, and chemically harmful substances such as dust particles in a high-temperature waste gas causes pollution to the environment and also causes great harm to human health.

In the prior art, for high-temperature waste gas control in the printing and dyeing industry, "water spraying+heat transfer temperature reduction+static dust removal" is usually used. However, such a manner cannot adequately meet environmental protection requirements. Devices are prone to blockage and fire, have potential safety hazards, and are inconvenient to maintain. In an existing control manner, odors and smells in a waste gas are not thoroughly removed, purification efficiency of a high-temperature waste gas is not good, and residual heat of a high-temperature waste gas is also not thoroughly utilized.

SUMMARY OF THE INVENTION

For this, a technical problem to be resolved by the present invention is to overcome disadvantages in the prior art, and provide a waste gas purification apparatus and a residual heat utilization and control device for intelligent printing and dyeing waste gas, to implement cascade utilization of residual heat of a high-temperature waste gas and combined removal of odors and smells in the textile printing and dyeing industry. In addition, powerful capture of ultra-fine particles can be further implemented, and low energy consumption running is implemented in combination with automated control.

To resolve the foregoing technical problems, the present invention provides a waste gas purification apparatus, including:
a circulating water storage tank;
a liquid circulation tank;
a water filtration system, connected to the circulating water storage tank;
a bubble generation device, connected to the circulating water storage tank; and
an organic waste gas removal device, where an upper end of the organic waste gas removal device is simultaneously connected to the bubble generation device and the liquid circulation tank, and a lower end of the organic waste gas removal device is connected to the liquid circulation tank, where
the organic waste gas removal device includes a support base, a reaction tank is assembled on an upper end of the support base, a drive motor is assembled on the reaction tank, a first connecting pipe and a second connecting pipe are assembled on the reaction tank, the first connecting pipe is connected to the liquid circulation tank, the second connecting pipe is connected to the bubble generation device, and a bottom of the reaction tank is connected to the liquid circulation tank by a third connecting pipe; and a gas outlet pipe is assembled on an upper end of the reaction tank;
a connecting shaft is coaxially disposed on an output shaft of the drive motor, a flow guide vane is disposed on the connecting shaft, and an edge of the flow guide vane is tangential to an inner wall of the reaction tank; and
a fixing lead screw is disposed in the reaction tank, the fixing lead screw is disposed on an upper end of the third connecting pipe, a micro motor is disposed between the fixing lead screw and the third connecting pipe, and a bubble cleaning assembly is disposed on the fixing lead screw; and two spiral grooves at equal distances from the flow guide vane are respectively opened on the connecting shaft at an upper side and a lower side of the flow guide vane, and the bubble cleaning assembly is slidably connected to the spiral grooves.

Preferably, the bubble cleaning assembly includes a rotating block and a rotating frame, an inner thread is disposed on the rotating block, the rotating block is assembled on the fixing lead screw by the inner thread, and an inner cylinder cleaning pad is disposed on each of an upper plane and a lower plane of the rotating block; the rotating frame is rotatably assembled at a center of a side wall of the rotating block, two sliding blocks are assembled on the rotating frame, the two sliding blocks are respectively slidably assembled in the two spiral grooves, a pair of brush vane plates are disposed opposite on inner sides of the two sliding blocks, and a brush is disposed on the brush vane plate.

Preferably, an outer cylinder cleaning pad is coaxially slidably sleeved on the connecting shaft, a rotating shaft is disposed on an outer side surface of the sliding block, a two-way telescopic device is slidably disposed on the rotating shaft, and the two-way telescopic device is inserted in the outer cylinder cleaning pad.

Preferably, an exhaust port is disposed at an upper end of the liquid circulation tank, and a water suction pump is assembled at an end of the first connecting pipe connected to the liquid circulation tank.

In another aspect, the present invention further provides a residual heat utilization and control device for intelligent printing and dyeing waste gas, including a residual heat cascade utilization unit, a spraying unit, a composite pulse static absorption column unit, a twin-stage high-temperature water white smoke elimination unit, and an air discharge unit that are sequentially disposed in a waste gas flow direction, and further including an oil-water separation box, a sodium chloride electrolysis device, and the waste gas purification apparatus described above, where the oil-water separation box is connected to the waste gas purification apparatus, the sodium chloride electrolysis device, the composite pulse static absorption column unit, and the residual heat cascade utilization unit, the sodium chloride electrolysis device is connected to the spraying unit, and the waste gas purification apparatus is connected to the spraying unit, the composite pulse static absorption column unit, and the oil-water separation box.

Preferably, the spraying unit includes a micro bubble water spraying device, a hypochlorous acid/water spraying device, and a sodium hydroxide water spraying device, and the micro bubble water spraying device is connected to a bubble generation device in the waste gas purification apparatus by a first connecting pipe.

Preferably, the composite pulse static absorption column unit includes a first composite pulse static absorption column and a second composite pulse static absorption column that are connected to each other, an exhaust port of the first composite pulse static absorption column is in fluid communication with an air inlet of the second composite pulse static absorption column, and a gas outlet pipe in the waste gas purification apparatus is in fluid communication with the air inlet of the second composite pulse static absorption column.

Preferably, a first liquid inlet pipe in the waste gas purification apparatus is in fluid communication with the oil-water separation box.

Preferably, the residual heat cascade utilization unit includes a high-temperature gas-gas heat exchanger, a middle-temperature gas-water heat exchanger, and a low-temperature gas-gas heat exchanger that are sequentially disposed in the waste gas flow direction.

Preferably, the device further includes a plurality of steam automatic washing devices and a plurality of alkaline water automatic washing devices, where the plurality of steam automatic washing devices and the plurality of alkaline water automatic washing device are respectively disposed in the residual heat cascade utilization unit and the composite pulse static absorption column unit.

Preferably, the device further includes a plurality of adhesive automatic detection devices, and the plurality of adhesive automatic detection devices are respectively disposed in the residual heat cascade utilization unit and the composite pulse static absorption column unit.

Preferably, the air discharge unit includes an air discharge pipe and an exhaust fan and a real-time gas monitoring device that are disposed in the air discharge pipe.

Compared with the prior art, the foregoing technical solution of the present invention has the following advantages:

The waste gas purification apparatus of the present invention can enable a low-concentration small-molecular chain organic waste gas in a waste gas to thoroughly contact high-concentration micro-bubble spraying water, to generate double effects including physical and chemical effects such as mechanical shearing, pyrolysis, and free radical oxidation, so that the small-molecular chain organic pollutants in the waste gas are decomposed and converted into $CO_2$, $H_2O$, $N_2$, and some solid particles. In addition, the waste gas purification apparatus of the present invention can react with organic pollutants dissolved in water and degrade the organic pollutants. In addition, the problem that some bubbles are attached to an inner wall of a processing apparatus is solved, thereby greatly improving the purification efficiency of the apparatus. The intelligent printing and dyeing waste gas utilization and control device of the present invention to implements cascade utilization of residual heat of a high-temperature waste gas and combined removal of odors and smells in the textile printing and dyeing industry. In addition, powerful capture of ultra-fine particles can be further implemented, and a residual heat cascade utilization process of low energy consumption running is implemented in combination with automated control, so that double effects of energy saving and environmental protection are achieved.

BRIEF DESCRIPTION OF THE DRAWINGS

To make the content of the present invention clearer and more comprehensible, the present invention is further described in detail below according to specific embodiments of the present invention and the accompanying draws. Where.

Reference numerals: 1. circulating water storage tank; 11. first connecting pipe; 12. second connecting pipe; 13. third connecting pipe; 14. fourth connecting pipe; 2. liquid circulation tank; 21. exhaust port; 22. water suction pump; 3. water filtration system; 30. first liquid inlet pipe; 4. bubble generation device; 5. organic waste gas removal device; 51. support base; 52. reaction tank; 53. drive motor; 54. gas outlet pipe; 55. connecting shaft; 56. flow guide vane; 57. fixing lead screw; 58. bubble cleaning assembly; 581. rotating block; 5810. inner cylinder cleaning pad; 582. rotating frame; 583. first sliding block; 584. second sliding block; 585. first brush vane plate; 586. second brush vane plate; 587. brush; 588. outer cylinder cleaning pad; 589. two-way telescopic device; 59. material discharge hole; 590. extension spring; 6. oil-water separation box; 60. high-temperature gas-gas heat exchanger; 601. first steam automatic washing device; 602. second steam automatic washing device; 61. middle-temperature gas-water heat exchanger; 62. low-temperature gas-gas heat exchanger; 63. first alkaline water automatic washing device; 64. second alkaline water automatic washing device; 65. third alkaline water automatic washing device; 66. first adhesive automatic detection device; 67. second adhesive automatic detection device; 68. third adhesive automatic detection device; 69. fourth adhesive automatic detection device; 7. sodium chloride electrolysis device; 81. micro bubble water spraying device; 82. hypochlorous acid/water spraying device; 83. sodium hydroxide water spraying device; 84. demisting device; 91. first composite pulse static absorption column; 92. second composite pulse static absorption column; 93. air discharge pipe; 94. exhaust fan; 95. gas monitoring device; and 96. electric control cabinet.

DETAILED DESCRIPTION OF THE PREFERRED EMBODIMENTS

The present invention is further described below with reference to the accompanying drawings and specific embodiments, to enable a person skilled in the art to better understand and implement the present invention. However, the embodiments are not used to limit the present invention.

Embodiment 1

Referring to FIG. 1 to FIG. 5, the present invention provides a waste gas purification apparatus, including:
- a circulating water storage tank 1;
- a liquid circulation tank 2;
- a water filtration system 3, where an outlet of the water filtration system is connected to the circulating water storage tank 1, an inlet of the water filtration system 3 is configured to filter an external pollutive liquid, and a first liquid inlet pipe 30 is provided at the inlet of the water filtration system 3;
- a bubble generation device 4, connected to the circulating water storage tank 1; and
- an organic waste gas removal device 5, where an upper end of the organic waste gas removal device is connected to the bubble generation device 4 and the liquid circulation tank 2, and a lower end of the organic waste gas removal device 5 is fixedly connected to the liquid circulation tank 2.

Figure 1:
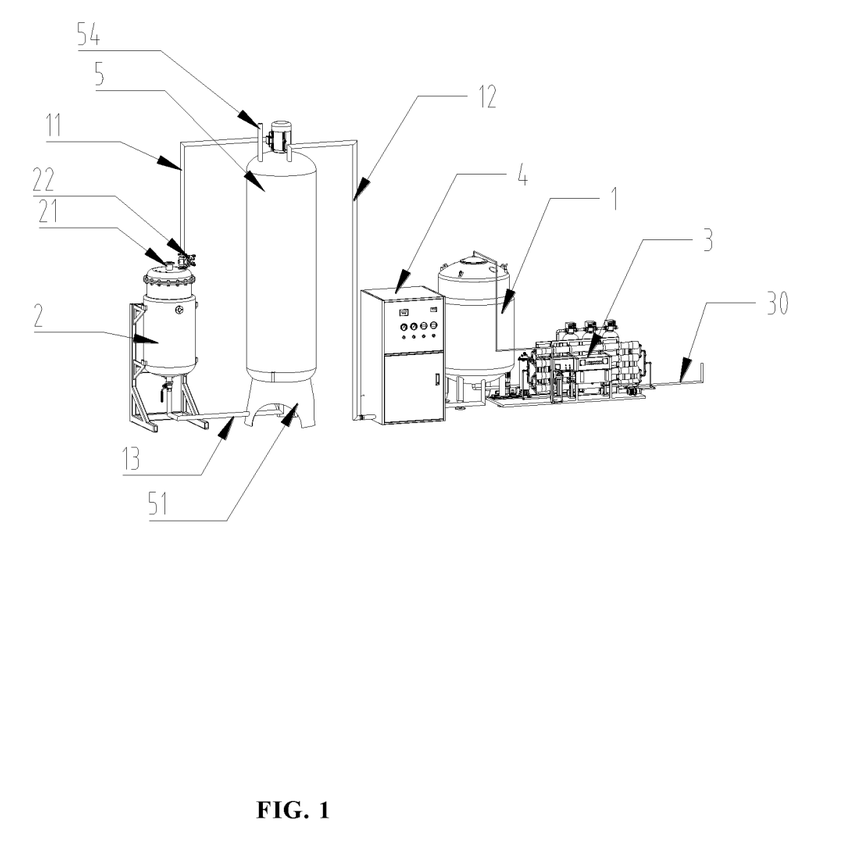
FIG. 1 is a schematic diagram of a waste gas purification apparatus according to an optimal embodiment of the present invention.
Figure 2:
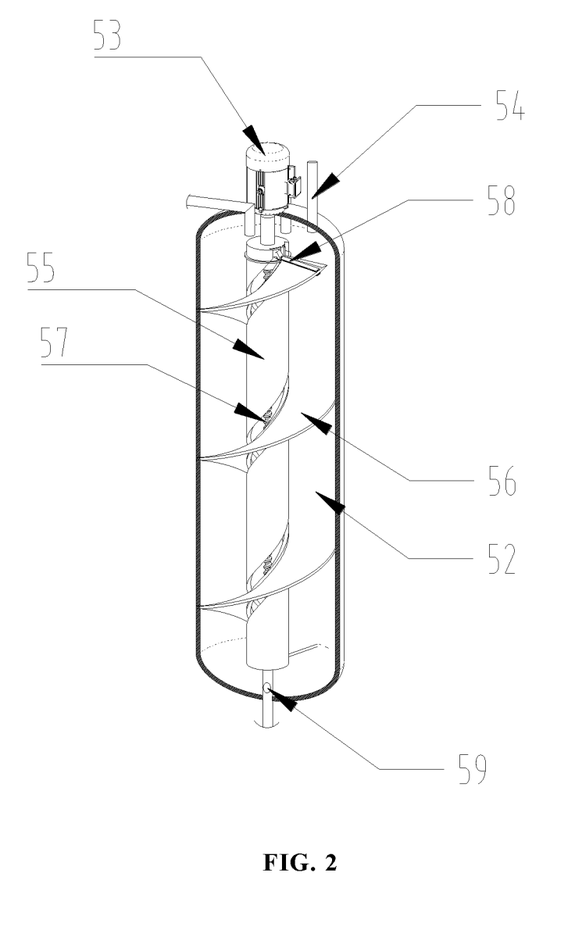
FIG. 2 is a partial schematic diagram of an organic waste gas removal device in a waste gas purification apparatus according to an optimal embodiment of the present invention.

As a preferred embodiment, the organic waste gas removal device 5 includes a support base 51, a reaction tank 52 is assembled on an upper end of the support base 51, a drive motor 53 is assembled on the reaction tank 52, a first connecting pipe 11 and a second connecting pipe 12 are assembled on the reaction tank 52, and the first connecting pipe 11 and the second connecting pipe 12 are respectively located at two sides of the drive motor 53. The first connecting pipe 11 is connected to the liquid circulation tank 2, and the second connecting pipe 12 is connected to the bubble generation device 4. A bottom of the reaction tank 52 is connected to the liquid circulation tank 2 by a third connecting pipe 13. A gas outlet pipe 54 is assembled on an upper end of the reaction tank 52.

Further, an exhaust port 21 is disposed at a center of an upper end of the liquid circulation tank 2, a water suction pump 22 is assembled at an end of the first connecting pipe 11 connected to the liquid circulation tank 2, and the water suction pump 22 is disposed on a lateral side of the exhaust port 21.

Bubbles generated by the bubble generation device 4 are not uniform, and therefore water pressures of breaking balances of the bubbles are different. To keep some bubbles from bursting at a bottom of the organic waste gas removal device 5 and entering the liquid circulation tank 2 carried by a water flow, the exhaust port 21 is disposed. In addition, a lower end of the water suction pump 22 deeply enters a lower end of a liquid level in the liquid circulation tank 2. A liquid in the liquid circulation tank 2 is sucked into the organic waste gas removal device 5 under the action of the water suction pump 22, to implement the cyclic utilization of water resources.

Further, a connecting shaft 55 is coaxially disposed on an output shaft of the drive motor 53, a flow guide vane 56 is disposed on the connecting shaft 55, and an edge of the flow guide vane 56 is tangential to an inner wall of the reaction tank 52.

As seen from details, a fixing lead screw 57 is disposed in the reaction tank 52, the fixing lead screw 57 is disposed at an end of the third connecting pipe 13 connected to the reaction tank 52, and the fixing lead screw 57 is disposed on an upper end of the third connecting pipe 13. A micro motor is disposed between the fixing lead screw 57 and the third connecting pipe 13, the micro motor is assembled on the third connecting pipe 13, and the micro motor is configured to drive the fixing lead screw 57 to rotate. A bubble cleaning assembly 58 is disposed on the fixing lead screw 57; and two spiral grooves at equal distances from the flow guide vane 56 are respectively opened on the connecting shaft 55 at an upper side and a lower side of the flow guide vane, and the bubble cleaning assembly 58 is slidably connected to the spiral grooves.

The micro motor rotates in a counterclockwise rotation, the drive motor 53 rotates in a clockwise rotation, and when the bubble cleaning assembly 58 moves to a bottom of the flow guide vane 56, in this case, the micro motor is started. Because the bubbles generated by the bubble generation device 4 have different diameters and each bubble needs to form one balance in water, a pressure in the bubble needs to be equal to a water pressure plus a compensational pressure generated from surface tension of water on the bubble. When this balance is broken, the bubble bursts. In addition, a pressure in a bubble is inversely proportional to a diameter of the bubble. Therefore, water pressures required for bubbles with different diameters to burst are different. If bubbles are injected from the bottom, some bubbles burst without thorough combination with water, some bubbles that do not meet a balance condition rise with the water flow to a water surface and do not burst in water, and at the same time some bubbles are attached to an inner wall of a container, so that the flow guide vane 56 may enable the water flow to move downward. Because bubbles are small, buoyancy can be basically ignored, and bubbles are prone to the impact of flowing of the water flow, and move downward with the water flow. As bubbles go deeper in water, water pressures on the bubbles also increase. In this case, bubbles with different diameters may be thoroughly combined with water and at the same time gradually meet a bursting condition. While rotating, the flow guide vane 56 cleans bubbles attached to the inner wall of the reaction tank 52. With such an arrangement, the purification efficiency of bubbles can be further improved.

In an initial state, the bubble cleaning assembly 58 is located above the flow guide vane 56. When the apparatus is running, certain bubbles are attached to the flow guide vane 56 to affect the purification efficiency. When the flow guide vane 56 starts to rotate, the micro motor is turned off, and the fixing lead screw 57 is in a relatively stationary state. Because the bubble cleaning assembly 58 is slidably connected to the spiral groove, while the flow guide vane 56 drives the bubble cleaning assembly 58 to rotate, the fixing lead screw 57 makes the bubble cleaning assembly move downward, to clean bubbles at different positions on the flow guide vane 56. When the bubble cleaning assembly moves to a lowest position of the flow guide vane 56, the micro motor is started, and a rotational speed of the micro motor is greater than a rotational speed of the drive motor 53, to make the bubble cleaning assembly 58 rise. When the bubble cleaning assembly returns to an initial position of the bubble cleaning assembly, the micro motor is turned off, and the foregoing operations are repeated, so that the attachment of micro bubbles on the assemblies of the apparatus can be adequately eliminated, thereby improving the purification efficiency of bubbles.

Further, a plurality of groups of material discharge holes 59 are opened on the third connecting pipe 13 connecting a lower end of the fixing lead screw 57 and the reaction tank 52.

During working, water occupying 90% of the volume of the reaction tank 52 is first injected into the reaction tank, the bubble generation device 4 is started to inject micro bubbles into the reaction tank 52, and a switch valve, the drive motor 53, and the water suction pump 22 below the liquid circulation tank 2 are simultaneously turned on. A part of a water flow enters the liquid circulation tank 2 through the material discharge hole 59. The micro bubbles are driven by the water flow to move downward, and balance conditions are gradually broken as the depth increases. The bubbles burst to generate a large amount of active hydroxyl groups. The active hydroxyl groups and active oxygen group quickly complete oxidation and degradation of organic pollutants in the water, to achieve the objective of purifying the organic pollutants. In addition, a purified gas rises and is discharged from the apparatus through the gas outlet pipe 54, and while the water flow enters the liquid circulation tank 2, the water suction pump 22 reinjects water in the liquid circulation tank 2 into the reaction tank 52. An injection rate of the water suction pump 22 is equal to an outflow rate of the reaction tank 52, to keep a liquid level in the reaction tank 52 at an initial level, and the liquid level in the liquid circulation tank 2 is lower than the liquid level in the reaction tank 52, so that a siphon effect may be formed to a certain degree, to increase a liquid flowing speed in the reaction tank 52, thereby improving the purification efficiency.

It can be learned that the present invention seeks to protect a waste gas purification apparatus based on a micro bubble waste gas processing principle, in which a circulating water storage tank, a liquid circulation tank, a water filtration system, a bubble generation device, and an organic waste gas removal device are disposed. An external pollutive liquid is fed into the water filtration system 3, and is filtered and purified before entering the circulating water storage tank 1 to implement the cyclic utilization of water resources. A waste gas enters the bubble generation device 4. The bubble generation device 4 combines the waste gas and water to generate bubbles of micro and nano levels, which enter the organic waste gas removal device 5. The bubbles keep moving downward under the action of a water flow and burst when balances inside the bubbles are broken. Pollutants are degraded, and a purified gas rises and is discharged through the gas outlet pipe 54. The liquid passes through the third connecting pipe 13 from a lower end of the organic waste gas removal device 5 to enter the liquid circulation tank 2.

Figure 3:
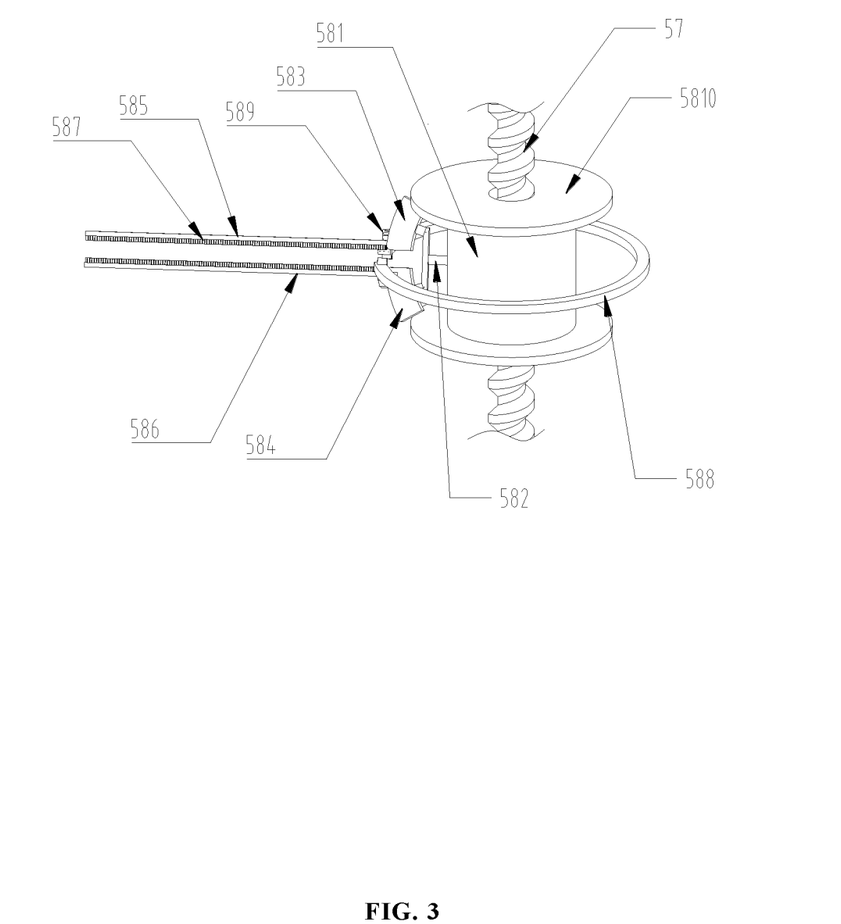
FIG. 3 is a partial schematic diagram of a bubble cleaning assembly in a waste gas purification apparatus according to an optimal embodiment of the present invention.

Furthermore, the bubble cleaning assembly 58 includes a rotating block 581 and a rotating frame 582, an inner thread is disposed on the rotating block 581, the rotating block 581 is assembled on the fixing lead screw 57 by the inner thread, and two inner cylinder cleaning pads 5810 are respectively disposed on an upper surface and a lower surface of the rotating block 581. The rotating frame 582 is rotatably assembled at a center of a side wall of the rotating block 581, a first sliding block 583 and a second sliding block 584 are symmetrically assembled on the rotating frame 582, the first sliding block 583 and the second sliding block 584 are respectively slidably assembled in the two spiral grooves, a first brush vane plate 585 and a second brush vane plate 586 are disposed opposite to each other on the first sliding block 583 and the second sliding block 584, and brushes 587 are disposed opposite on the first brush vane plate 585 and the second brush vane plate 586.

Figure 4:
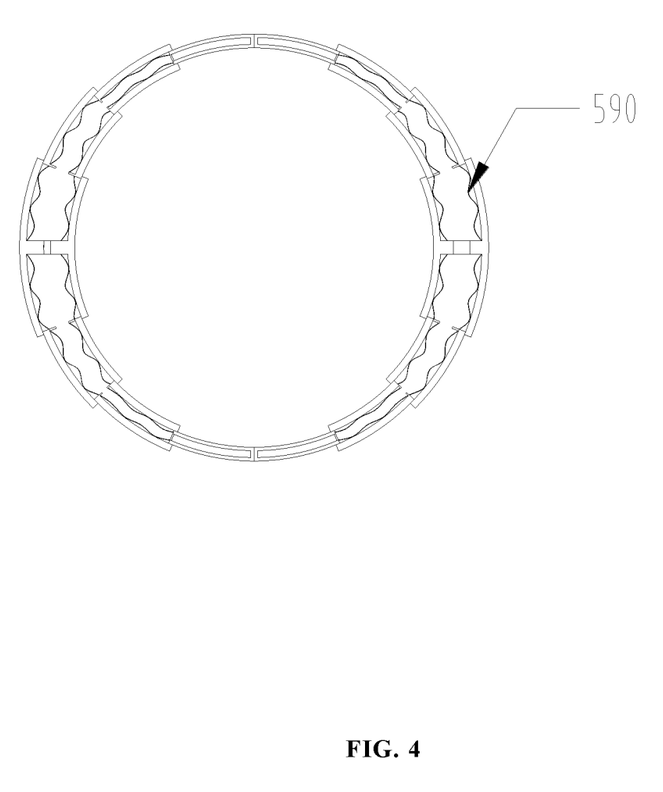
FIG. 4 is a schematic exploded view of a two-way telescopic device in a waste gas purification apparatus according to an optimal embodiment of the present invention.

Specifically, an outer cylinder cleaning pad 588 is coaxially slidably sleeved on the connecting shaft 55, a first rotating shaft is disposed on an outer side surface of the first sliding block 583, a two-way telescopic device 589 is slidably disposed on the first rotating shaft, and the two-way telescopic device 589 is inserted in the outer cylinder cleaning pad 588. The outer cylinder cleaning pad 588 is coaxially slidably sleeved on the flow guide vane 56. The two-way telescopic device 589 is disposed on the second sliding block 584 in a same manner.

The two-way telescopic device 589 is a two-way four-stage telescopic mechanism, and each stage is connected by two extension springs 590.

In a specific implementation process, the two inner cylinder cleaning pads 5810 and the outer cylinder cleaning pad 588 may respectively clean bubbles attached to a column surface of the flow guide vane 56, and the bubbles are driven by the flow guide vane 56 and the water flow to move downward until the bubbles burst when balance conditions of the bubbles are broken. In a rotation process of the rotating block 581, bubbles on the fixing lead screw 57 are cleaned, and the brushes 587 remove bubbles on the flow guide vane 56. In a rotation and descending process of the rotating block 581, the first sliding block 583 and the second sliding block 584 remain joined to the spiral grooves in the connecting shaft 55 through the rotation of the rotating frame 582, so that a plane in which the first brush vane plate 585 and the second brush vane plate 586 are located remain parallel to a cross section of the flow guide vane 56 at the position. In addition, in a rotation process of the first sliding block 583 and the second sliding block 584, the telescopic movement of the stages of the two-way telescopic device 589 ensures that the outer cylinder cleaning pad 588 remains coaxial with the flow guide vane 56, and the extension spring 590 can enable the two-way telescopic device 589 to retract when there is no action of the first sliding block 583 and the second sliding block 584, to keep the two-way telescopic device from affecting the vertical movement of the rotating block 581. In addition, the extension spring 590 has a certain limiting action on the stages of the two-way telescopic device 589, to keep the stages from detaching to cause damage to the two-way telescopic device 589.

The waste gas purification apparatus based on the micro bubble principle of the present invention can enable a low-concentration small-molecular chain organic waste gas in a waste gas to thoroughly contact high-concentration micro-bubble spraying water, to generate double effects including physical and chemical effects such as mechanical shearing, pyrolysis, and free radical oxidation, so that the small-molecular chain organic pollutants in the waste gas are decomposed and converted into $CO_2$, $H_2O$, $N_2$, and some solid particles. In addition, the waste gas purification apparatus of the present invention can react with organic pollutants dissolved in water and degrade the organic pollutants. In addition, the problem that some bubbles are attached to an inner wall of a processing apparatus is solved, thereby greatly improving the purification efficiency of the apparatus.

Embodiment 2

Figure 5:
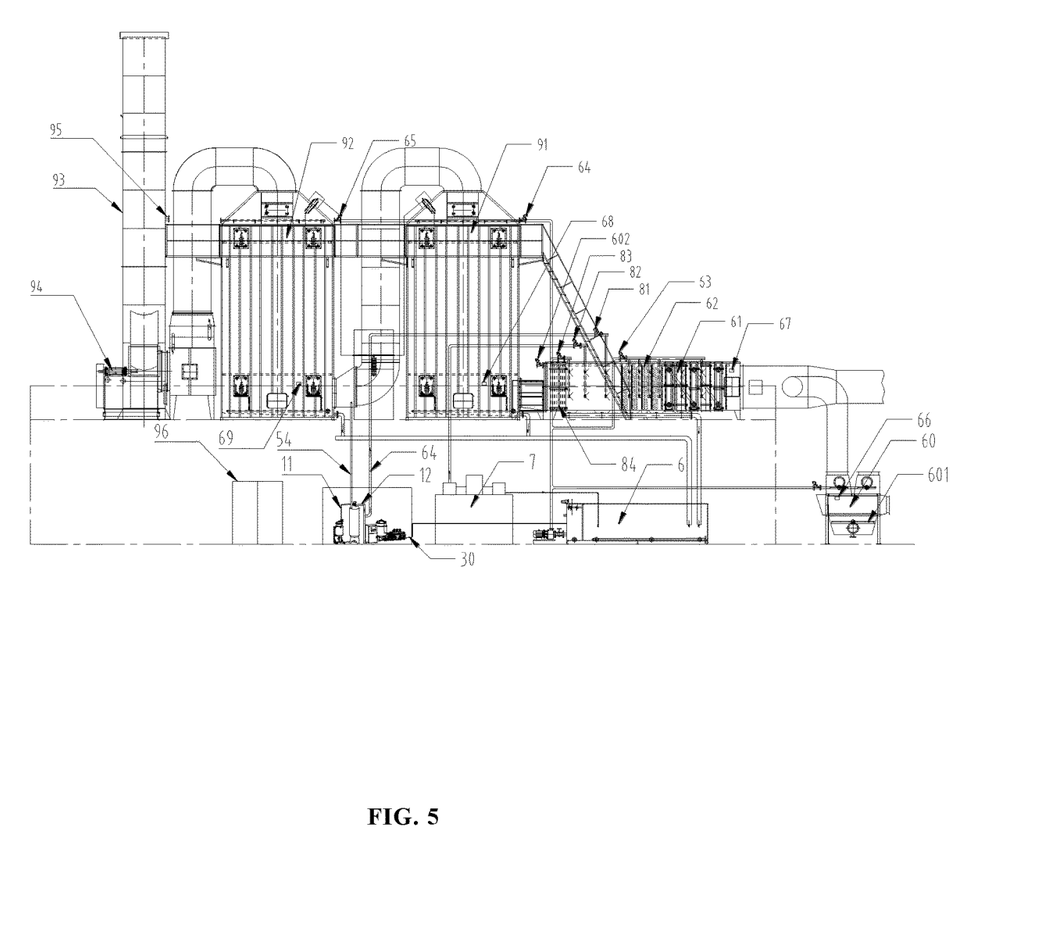
FIG. 5 is a schematic diagram of an intelligent printing and dyeing waste gas utilization and control device according to an optimal embodiment of the present invention.

The present invention further discloses a residual heat utilization and control device for intelligent printing and dyeing waste gas, including:

a residual heat cascade utilization unit, a spraying unit, a composite pulse static absorption column unit, a twin-stage high-temperature water white smoke elimination unit, and an air discharge unit that are sequentially disposed in a waste gas flow direction. A waste gas generated from printing and dyeing enters from the residual heat cascade utilization unit, sequentially passes through the spraying unit, the composite pulse static absorption column unit, and the twin-stage high-temperature water white smoke elimination unit, and is discharged from the air discharge unit.

The device further includes an oil-water separation box 6, a sodium chloride electrolysis device 7, and the waste gas purification apparatus as described above. The oil-water separation box 6 is respectively connected to the waste gas purification apparatus, the sodium chloride electrolysis device 7, the composite pulse static absorption column unit, and the residual heat cascade utilization unit. The sodium chloride electrolysis device 7 is connected to the spraying unit.

It needs to be noted that the waste gas purification apparatus is respectively joined to the spraying unit and the composite pulse static absorption column unit.

Specifically, the spraying unit includes a micro bubble water spraying device 81, a hypochlorous acid/water spraying device 82, and a sodium hydroxide water spraying device 83, and the micro bubble water spraying device is connected to a bubble generation device in the waste gas purification apparatus by a fourth connecting pipe 14. It needs to noted that the fourth connecting pipe 14 is in fluid communication with the second connecting pipe 12 of the waste gas purification apparatus.

The sodium chloride electrolysis device 7 can simultaneously generate a hypochlorous acid solution and a sodium hydroxide solution. The generated hypochlorous acid solution is fed into the hypochlorous acid/water spraying device 82. An oxidation and decomposition reaction continues to occur between hypochlorous acid atomized spraying water and a remaining organic waste gas in the waste gas, so that odors of the organic waste gas contained in the waste gas are further removed. Through nearby preparation and instant use, the problem that sodium hypochlorite is prone decomposition is effectively avoided. The sodium hydroxide solution generated by the sodium chloride electrolysis device 7 is fed into the sodium hydroxide water spraying device 83, so that a hypochlorous acid that does not participate in the reactions in a previous procedure can be neutralized, to eliminate corrosion to subsequent devices. In addition, the sodium hydroxide solution reacts with an acidic waste gas in the waste gas to reduce odors. The sodium hydroxide solution can further perform spraying and catch fluff, particles, carbon black, and the like, and make fluff, particles, carbon black, and the like carry water to facilitate subsequent static adsorption. Waste gases from textile printing and dyeing setting and drying devices have a lot of tiny capillary particles, and especially, a natural gas direct burning and heating manner, generates a large amount of ultra-fine particles of carbon black. Therefore, if no water is carried in previous processing, the particles are insulating substances, it is not easy for the particles to carry charges during static adsorption, and an adsorption effect is not good. With such an arrangement, the problem that back-end static adsorption is not good can be effectively solved.

In addition, a demisting device 84 is further disposed at a distal end of the spraying device, and a twin-stage folded-plate mechanism is used for the demisting device 84, so that water drops and mist can be effectively removed, and at the same time oil drops and particles are simultaneously removed, thereby reducing a back-end processing pressure.

Furthermore, the composite pulse static absorption column unit includes a first composite pulse static absorption column 91 and a second composite pulse static absorption column 92 that are connected to each other, an exhaust port of the first composite pulse static absorption column 91 is in fluid communication with an air inlet of the second composite pulse static absorption column 92, and a gas outlet pipe 54 in the waste gas purification apparatus is in fluid communication with the air inlet of the second composite pulse static absorption column 92. A basic voltage is superimposed on a pulse voltage, and an amplitude and a frequency are adjusted, to improve a capture effect of ultra-fine particles, thereby effectively improving a capture effect of generated tiny carbon black during use of natural gas direct burning. The composite pulse static absorption column unit uses a cellular vertical electric field, and the entire structure is stable and reliable. The first composite pulse static absorption column 91 and the second composite pulse static absorption column 92 both use upper air outlet negative pressure adsorption. Therefore, a relatively small amount of oil drops and liquid drops is carried out. Oil, dust, and the like are efficiently adsorbed and condensed, and are discharged together through a drain outlet pipe under the action of gravity. In addition, a water automatic washing eddy nozzle is arranged at an upper portion, and a steam automatic washing device is arranged at a lower portion, to wash off a mixture of oil, wax, particles, and the like adhered to a pipe wall. In addition, an insulating ceramic automatic washing mechanism is further disposed, so that long-term cleanness inside a static column body can be kept, to avoid potential safety hazards.

Specifically, the twin-stage high-temperature water white smoke elimination unit is disposed at an outlet of the second composite pulse static absorption column 92. The twin-stage high-temperature water white smoke elimination unit can utilize steam condensed water collected in a workshop, a high-temperature clear water recycled from a dye vat, and the like, to perform parallel twin-stage heating and white steam removal on a purified waste gas, thereby eliminating a "visual pollution" problem of white steam at a discharge outlet, and implementing "colorless and odorless" ultra-low discharge.

The air discharge unit is connected to the twin-stage high-temperature water white smoke elimination unit, and the air discharge unit includes an air discharge pipe 93 and an exhaust fan 94 and a real-time gas monitoring device 95 that are disposed in the air discharge pipe 93. The gas monitoring device 95 can monitor non-methane total hydrocarbon and odors in a discharged gas. When a discharge is abnormal, the gas monitoring device 95 can raise an alarm.

The first liquid inlet pipe 30 in the waste gas purification apparatus is in fluid communication with the oil-water separation box 6, and a liquid in the oil-water separation box 6 can pass through the first liquid inlet pipe 30 to enter the water filtration system 3 of the waste gas purification apparatus.

It needs to be noted that the residual heat cascade utilization unit includes a high-temperature gas-gas heat exchanger 60, a middle-temperature gas-water heat exchanger 61, and a low-temperature gas-gas heat exchanger 62 that are sequentially disposed in the waste gas flow direction. Through the high-temperature gas-gas heat exchanger 60, high-temperature fresh air (greater than 100° C.) can be transferred to an original production device for use, and an automatic blowback device is disposed at an air inlet filter screen, to avoid blockage in the air inlet filter screen. Middle-temperature hot water (50° C. to 70° C.) in the middle-temperature gas-water heat exchanger 61 can be recycled for production and use, thereby effectively saving energy. Hot air in the low-temperature gas-gas heat exchanger 62 can be recycled for workshop warming in winter, air acquisition of an air source heat pump, preheating of a drying device, among other working conditions that require fresh hot air. A residual heat cascade utilization process implements the maximization of residual heat utilization, thereby implementing thorough combination of energy saving and environmental protection.

In addition, an air pressure adjustment device is further disposed in the residual heat cascade utilization unit, and the air pressure adjustment device is disposed at an inlet of the middle-temperature gas-water heat exchanger 61. The air pressure adjustment device can set a system air pressure value according to an actual working condition, to adjust a working frequency of a fan in real time, thereby facilitating energy saving for running. In addition, a backwash mechanism is disposed at a front portion of a wind gauge, to ensure the stable running of the wind gauge.

The control device of the present invention further includes a plurality of alkaline water automatic washing devices, the plurality of alkaline water automatic washing devices are joined to the sodium chloride electrolysis device 7, and the sodium chloride electrolysis device 7 acquires a sodium hydroxide solution. Specifically, the device includes a first alkaline water automatic washing device 63 disposed in the low-temperature gas-gas heat exchanger 62, a second alkaline water automatic washing device 64 disposed in the first composite pulse static absorption column 91, and a third alkaline water automatic washing device 65 disposed in the second composite pulse static absorption column 92.

For details, the control device further includes a plurality of adhesive automatic detection devices. An ultrasonic surface wave is utilized to detect adhesives on a surface of metal inside the device. When the adhesives are accumulated to a certain degree, online automatic washing devices are turned on to effectively solve a blockage problem of adhesives inside the device and a safety problem of adhesives catching fire. The plurality of adhesive automatic detection devices are respectively disposed in the residual heat cascade utilization unit and the composite pulse static absorption column unit. Specifically, the device includes a first adhesive automatic detection device 66 disposed in the high-temperature gas-gas heat exchanger 60, a second adhesive automatic detection device 67 disposed in the middle-temperature gas-water heat exchanger 61, a third adhesive automatic detection device 68 disposed in the first composite pulse static absorption column 91, and a fourth adhesive automatic detection device 69 disposed in the second composite pulse static absorption column 92.

Further, the control device further includes a plurality of steam automatic washing devices, and includes a first steam automatic washing device 601 disposed in the high-temperature gas-gas heat exchanger 60 and a second steam automatic washing device 602 disposed at an outlet of the spraying unit.

Furthermore, a plurality of temperature detection devices are disposed in the control device to monitor a temperature status in real time, to facilitate corresponding control and adjustment. For example, when a temperature exceeds an alert temperature, an alarm is raised, the device is stopped, steam and water fire control is automatically turned on, and a fire alarm is notified to a production workshop. An air outlet temperature and a fan frequency are adjusted in real time, and a water removal temperature and a proportional valve are adjusted in real time.

The control device further includes an electric control cabinet 96. The residual heat cascade utilization unit, the spraying unit, the composite pulse static absorption column unit, the twin-stage high-temperature water white smoke elimination unit, the air discharge unit, the plurality of alkaline water automatic washing devices, the air pressure adjustment device, the plurality of steam automatic washing devices, the plurality of adhesive automatic detection devices, and the plurality of temperature detection device are all joined to the electric control cabinet, to implement automated control.

When the waste gas purification apparatus of the present invention is used in combination with the intelligent printing and dyeing waste gas utilization and control device, a working principle and a procedure of the waste gas purification apparatus are as follows: After a waste gas generated from processing undergoes early-stage heat transfer temperature reduction and a plurality of times of spraying, a pollutive liquid generated in the apparatus enters the oil-water separation box 6. After initial deposition, large particles settle to the bottom. After oil-water separation at an upper portion, water is acquired from the oil-water separation box 6 to enter the water filtration system 3. After filtration, the water enters the circulating water storage tank 1 to implement the cyclic utilization of water resources. In this case, some harmful organic pollutants are dissolved in the polluted water.

The bubble generation device 4 enables filtered waste water to generate bubbles of micro and nano levels, and divides the waster water into two pipes. One pipe of the waste water is fed into the micro bubble water spraying device 81 and is configured to be directly sprayed to a waste gas to contact a low-concentration small-molecular chain organic waste gas in the waste gas to generate double effects including physical and chemical effects such as mechanical shearing, pyrolysis, and free radical oxidation, so that the small-molecular chain VOCs in the waste gas are decomposed and decomposed into carbon dioxide, water, nitrogen, and some solid particles.

The other pipe of the waste water enters the organic waste gas removal device 5, and bubbles keep moving downward under the action of a water flow and burst when balances inside the bubbles are broken to degrade pollutants in the apparatus. A gas generated from purified organic pollutants rises, and is sucked by a negative pressure to enter a next overall processing procedure, to keep a waste gas without full reaction from overflowing. A liquid enters the liquid circulation tank 2 from a lower end, and then passes through the water suction pump 22 to enter the organic waste gas removal device 5 again, to complete the cyclic utilization of water resources.

Obviously, the foregoing embodiments are merely examples for clear description, rather than a limitation to implementations. For a person of ordinary skill in the art, other changes or variations in different forms may also be made based on the foregoing description. All implementations cannot and do not need to be exhaustively listed herein. Obvious changes or variations that are derived there from still fall within the protection scope of the invention of the present invention.

What is claimed is:

1. A waste gas purification apparatus, comprising:
   a circulating water storage tank;
   a liquid circulation tank;
   a water filtration system, connected to the circulating water storage tank;
   a bubble generation device, connected to the circulating water storage tank; and
   an organic waste gas removal device, wherein an upper end of the organic waste gas removal device is connected to the bubble generation device and the liquid circulation tank, and a lower end of the organic waste gas removal device is connected to the liquid circulation tank, wherein the organic waste gas removal device comprises a support base, a reaction tank is assembled on an upper end of the support base, a drive motor is assembled on the reaction tank, a first connecting pipe and a second connecting pipe are assembled on the reaction tank, the first connecting pipe is connected to the liquid circulation tank, the second connecting pipe is connected to the bubble generation device, and a bottom of the reaction tank is connected to the liquid circulation tank by a third connecting pipe; and a gas outlet pipe is assembled on an upper end of the reaction tank;

a connecting shaft is coaxially disposed on an output shaft of the drive motor, a flow guide vane is disposed on the connecting shaft, and an edge of the flow guide vane is tangential to an inner wall of the reaction tank; and a fixing lead screw is disposed in the reaction tank, the fixing lead screw is disposed on an upper end of the third connecting pipe, a micro motor is disposed between the fixing lead screw and the third connecting pipe, and a bubble cleaning assembly is disposed on the fixing lead screw; and two spiral grooves at equal distances from the flow guide vane are respectively opened on the connecting shaft at an upper side and a lower side of the flow guide vane, and the bubble cleaning assembly is slidably connected to the spiral grooves.

2. The waste gas purification apparatus according to claim 1, wherein the bubble cleaning assembly comprises a rotating block and a rotating frame, an inner thread is provided on the rotating block, the rotating block is assembled on the fixing lead screw by the inner thread, and an inner cylinder cleaning pad is disposed on each of an upper plane and a lower plane of the rotating block; the rotating frame is rotatably assembled at a center of a side wall of the rotating block, two sliding blocks are assembled on the rotating frame, the two sliding blocks are slidably assembled in the two spiral grooves respectively, a pair of brush vane plates are disposed opposite on inner sides of the two sliding blocks, and a brush is disposed on the brush vane plate.

3. The waste gas purification apparatus according to claim 2, wherein an outer cylinder cleaning pad is coaxially slidably sleeved on the connecting shaft, a rotating shaft is disposed on an outer side surface of the sliding block, a two-way telescopic device is slidably disposed on the rotating shaft, and the two-way telescopic device is inserted in the outer cylinder cleaning pad.

4. The waste gas purification apparatus according to claim 1, wherein an exhaust port is disposed on an upper end of the liquid circulation tank, and a water suction pump is assembled on an end of the first connecting pipe connected to the liquid circulation tank.

5. A residual heat utilization and control device for intelligent printing and dyeing waste gas, comprising a residual heat cascade utilization unit, a spraying unit, a composite pulse static absorption column unit, a twin-stage high-temperature water white smoke elimination unit, and an air discharge unit that are sequentially disposed in a waste gas flow direction, and further comprising an oil-water separation box, a sodium chloride electrolysis device, and the waste gas purification apparatus according to claim 1, wherein the oil-water separation box is connected to the waste gas purification apparatus, the sodium chloride electrolysis device, the composite pulse static absorption column unit, and the residual heat cascade utilization unit respectively, the sodium chloride electrolysis device is connected to the spraying unit, and the waste gas purification apparatus is connected to the spraying unit, the composite pulse static absorption column unit, and the oil-water separation box respectively.

6. The residual heat utilization and control device for intelligent printing and dyeing waste gas according to claim 5, wherein the spraying unit comprises a micro bubble water spraying device, a hypochlorous acid/water spraying device, and a sodium hydroxide water spraying device, and the micro bubble water spraying device is connected to a bubble generation device in the waste gas purification apparatus by the first connecting pipe.

7. The residual heat utilization and control device for intelligent printing and dyeing waste gas according to claim 5, wherein the composite pulse static absorption column unit comprises a first composite pulse static absorption column and a second composite pulse static absorption column that are connected to each other, an exhaust port of the first composite pulse static absorption column is in fluid communication with an air inlet of the second composite pulse static absorption column, and the gas outlet pipe in the waste gas purification apparatus is in fluid communication with the air inlet of the second composite pulse static absorption column.

8. The residual heat utilization and control device for intelligent printing and dyeing waste gas according to claim 5, wherein a first liquid inlet pipe in the waste gas purification apparatus is in fluid communication with the oil-water separation box.

9. The residual heat utilization and control device for intelligent printing and dyeing waste gas according to claim 5, wherein the residual heat cascade utilization unit comprises a high-temperature gas-gas heat exchanger, a middle-temperature gas-water heat exchanger, and a low-temperature gas-gas heat exchanger that are sequentially disposed in the waste gas flow direction.

10. The residual heat utilization and control device for intelligent printing and dyeing waste gas according to claim 5, further comprising a plurality of alkaline water automatic washing devices, wherein the plurality of alkaline water automatic washing device are respectively disposed in the residual heat cascade utilization unit and the composite pulse static absorption column unit.

11. The residual heat utilization and control device for intelligent printing and dyeing waste gas according to claim 5, further comprising a plurality of adhesive automatic detection devices, and the plurality of adhesive automatic detection devices are respectively disposed in the residual heat cascade utilization unit and the composite pulse static absorption column unit.

12. The residual heat utilization and control device for intelligent printing and dyeing waste gas according to claim 5, wherein the air discharge unit comprises an air discharge pipe and an exhaust fan and a real-time gas monitoring device that are disposed in the air discharge pipe.

* * * * *